United States Patent Office 3,202,627
Patented Aug. 24, 1965

3,202,627
PROCESS FOR PREPARING A GRAFT OF DIENE-STYRENE-ACRYLATE INTERPOLYMER WITH A VINYL CARBOXYLIC ACID
Paul R. Van Ess, Berkeley, and Roy W. Tess, Orinda, Calif., assignors to Shell Oil Company, New York, N.Y., a corporation of Delaware
No Drawing. Filed July 31, 1961, Ser. No. 127,796
9 Claims. (Cl. 260—29.7)

This invention relates to synthetic latex compositions which are interpolymers of polymerizable monomers. More particularly, the invention relates to the preparation of a latex composition which is an interpolymer of a styrene, an alkyl acrylate and/or an alkyl methacrylate, a conjugated diene and an alpha-beta vinylidene carboxylic acid.

Specifically, the invention provides a process for preparing freeze-thaw stable and mechanically stable latex which comprises adding a monomer mixture consisting essentially of from 10% to 20% of a conjugated diene, from 2% to 55% of a compound selected from the group consisting of styrene and ring-substituted styrene, from 20% to 87.5% of a compound selected from the group consisting of alkyl acrylates having from 4 to 12 carbon atoms, alkyl methacrylates having from 8 to 16 carbon atoms and mixtures thereof, and from 0.5% to 5% by weight of the monomer mixture of an alpha-beta vinylidene carboxylic acid to an aqueous emulsion comprising an emulsifier and a free-radical initiator, and then maintaining the temperature of the reaction mixture with agitation between about 15° C. and 100° C. until at least 70% conversion but less than 95% conversion is achieved, then adjusting the emulsion temperature to from about 20° C. to 60° C., and adding from 0.05 to 10 parts per 100 parts of monomers of an alpha-beta vinylidene carboxylic acid, then allowing the polymerization to proceed to substantial completion.

Copolymers made from monoethylenic monomers containing a vinyl group in aqueous emulsion are known to be useful as surface coatings, paper coatings, and for other uses. Such latices are particularly valuable for surface coatings or paints. Paints made with alkyl acrylates have known advantages such as scrub resistance, good exterior weather resistance, good color stability, and the like, and such films therefore possess certain superiorities over other paint latices such as rubber latex compositions. However, the cost of the acrylate latices has been comparatively higher than with other monoethylenic monomers because more expensive monomers are required.

In general, acrylate latices contain a monomer which by itself would form a soft polymer such as an alkyl acrylate together with a monomer which by itself would yield a hard polymer such as methyl methacrylate or styrene. However, certain difficulties are experienced in preparing latices utilizing styrene and alkyl acrylates which have a satisfactory freeze-thaw and mechanical stability and, at the same time, can be made without excessive coagulation during the polymerization thereof.

It is, therefore, an object of the present invention to provide a process for preparing latices which have satisfactory freeze-thaw and mechanical stability. It is another object to provide a process for preparing latices without excessive coagulation during polymerization. It is another object to provide a process for preparing acrylate latices having good scrub resistance and good exterior weather resistance. It is another object to provide a process for preparing acrylate latices more economically while retaining the desirable properties. It is a further object to provide a process for preparing latices which are particularly valuable for surface coatings and paints.

It has now been discovered that these and other objects may be accomplished by the process which comprises forming an aqueous emulsion containing (1) a monomer mixture consisting essentially of from 10% to 20% of a conjugated diene, from 2% to 55% of a compound selected from the group consisting of styrene and ring-substituted styrene, from 20% to 87.5% of a compound selected from the group consisting of alkyl acrylates having from 4 to 12 carbon atoms, alkyl methacrylates having from 8 to 16 carbon atoms and mixtures thereof, and from 0.05% to 5% by weight of the monomer mixture of an alpha-beta vinylidene carboxylic acid, (2) an emulsifier, (3) a free-radical initiator and then maintaining the temperature of the reaction mixture with agitation between about 15° C. and 100° C. until at least 70% conversion, but less than 95% conversion, is achieved, then adjusting the emulsion temperature to about 20° C. to 60° C., and adding from 0.05 to 10 parts per hundred parts of monomers of an alpha-beta vinylidene carboxylic acid, then allowing the polymerization to go to substantial completion.

It has also been discovered that this process for copolymerizing ethylenically unsaturated monomers in aqueous emulsion provides latices which have good freeze-thaw stability and mechanical stability as well as good scrub resistance and good exterior weather resistance.

The monomer mixture of the present invention contains a conjugated diene, a styrene, an alkyl acrylate and/or alkyl methacrylate, and an alpha-beta vinylidene carboxylic acid.

The conjugated dienes which are suitable for use in the present invention include, among others, butadiene, isoprene, piperylene, dimethylbutadiene, and ethylbutadiene. In general, dienes having up to 8 carbon atoms are preferred.

Although styrene is preferred, other equivalents may be used in place of all or part of the styrene. Such equivalents include side chain-substituted styrene which may be substituted with alkyl and/or halogen groups, such as, for example, alpha-methyl styrene and alpha-chlorostyrene, and nuclear or ring-substituted styrenes wherein the substituents are alkyl and/or halogen groups, and preferably the alkyl styrenes having more preferably from 1 to 4 carbon atoms and/or halogen groups, such as, for example, p-ethyl styrene (1-vinyl-4-ethylbenzene), p-methyl styrene, p-butyl styrene, p-chloro styrene, 1-vinyl-2-ethyl-4-chlorobenzene, 1-vinyl-2,4-diethylbenzene and 1-vinyl-2,4-dichlorobenzene.

In general, any alkyl acrylate having from 4 to 12 carbon atoms may be used such as, for example, methyl acrylate, ethyl acrylate, propyl acrylate, isopropyl acrylate, any butyl acrylate and 2-ethylhexyl acrylate. However, the preferred acrylates are those in which the alkyl group has from 2 to 4 carbon atoms such as ethyl, propyl and butyl.

The alkyl acrylate may be replaced or substituted in part with an equivalent amount of an alkyl methacrylate. In general, any alkyl methacrylate having from 8 to 16 carbon atoms may be used in lieu of or mixed with the alkyl acrylate, such as, for example, butyl methacrylate, decyl methacrylate, octyl methacrylate, and lauryl methacrylate. Commercially available mixed methacrylates such as decyl-octyl methacrylate may also be used.

In order to provide the desired copolymerization, it is necessary to include as a comonomer an alpha-beta vinylidene carboxylic acid. It is also necessary to add the same or different alpha-beta vinylidene carboxylic acid after the polymerization has proceeded to at least 70% conversion, but less than 95% conversion. Examples of suitable alpha-beta vinylidene carboxylic acids include, among others, acrylic acid, methacrylic acid and itaconic acid. The amount of acid used in both the initial emulsion polymerization (usually in an emulsion premix) and after substantial conversion is achieved (at least 70%) will depend to some extent on the monomer system employed and on the equivalent weight of the acid. Thus, in general, the amount of acid used originally in the monomer mixture will be from about 0.5% to 5% by weight based on the total monomer and, for acrylic or methacrylic acid, the amount will be more generally from about 1% to 3% by weight of the total monomer. Likewise, the amount of acid to be added to the emulsion after 70% conversion, but less than 95% conversion, is obtained will be from about 0.05 to 10 parts per 100 parts of monomer, and preferably from about 1 to 5 parts per 100 parts of monomer. The polymerization is then allowed to proceed to substantial completion, say, to about 97% or 98%. This period will generally range from a few hours to about 3 weeks depending upon the temperature, with a shorter time required at a higher temperature. Thus, at room temperature, about 10 days is generally required.

The reaction is carried out in an aqueous emulsion which contains at least one anionic emulsifier either alone or in combination with one or more nonionic emulsifiers. The anionic emulsifiers are generally present at full concentration during the entire polymerization reaction and may include so-called water soluble anionic emulsifiers and/or oil soluble anionic emulsifiers. The anionic emulsifiers include, among others, the potassium salt or other salts of sulfuric esters, alkane sulfonic acids and alkyl aromatic sulfonic acids. Typical anionic emulsifiers include the alkali metal salt of an alkyl-aryl-polyethoxy-ethanol sulfate and a representative sodium salt of alkyl-aryl-polyethoxy-ethanol sulfate is available commercially under the trade name of "Triton 770." Other typical anionic emulsifiers include an alkyl ester of sulfosuccinic acid salt, such as, dihexyl ester of sodium sulfosuccinic acid which is available commercially under the trade name "Aerosol MA"; sodium alkyl aryl polyether sulfonate ("Triton X–200"); sodium lauryl sulfate; and the salts of alkly aryl sulfonic acid such as the ammonium salt of alkyl aryl sulfonic acid, which is available commercially under the trade name of "Emcol P10–59." The amounts of each anionic emulsifier will vary depending on the monomers, catalyst and specific emulsifiers used. However, it will generally be within the range of, say, 0.3 to 3% by weight based on total monomer for each emulsifier.

The nonionic emulsifier may be present in part or not at all initially, with the remainder added during the process to improve the stability of the polymer particles as they are formed. The nonionic emulsifiers are composed of a hydrophobic or hydrocarbon portion and a hydrophilic portion which is a polyether chain usually terminated with an alcoholic hydroxyl group. Generally, the hydrophilic portion will contain repeating units of, say, 6–50 ether groups and hydrocarbon moieties of, say, about 7 to 12 carbon atoms. Particularly suitable is an octylphenol-ethylene oxide condensation product which is commercially available under such trade names as "Ope–30" and "Triton X–100." Other suitable products include those made by condensing ethylene oxide with alcohols such as nonyl, dodecyl, tetradecyl or alkyl-phenyls having alkyl groups of 6 to 15 carbon atoms. The amount of nonionic emulsifier varies with the system, but it will generally be within the range of, say, from 0.5 to 10% by weight based on total monomer.

As indicated above, the polymerization must be carried out in an emulsion in such a way that the monomers or polymers do not coagulate and which provide a stable product emulsion polymer. The emulsion polymerization system, therefore, must contain an effective catalyst system, which is preferably a free-radical initiator system. Any system that initiates free radicals is suitable for use in the present invention, such as, for example, high energy radiation, dissociative initiators, and redox systems. High energy radiation suitable for use in the present invention includes high energy electrons, protons and photons. Electron beams are suitably produced by electron accelerators such as the Van de Graaff, resonance transformers and linear accelerators or by a suitable arrangement of certain isotopes, e.g., strontium 90. High energy photons suitable for use are, for example, X-rays.

The dissociative initiators include, among others, peroxygen initiators, such as hydrogen peroxide, benzoyl peroxide and tertiarybutyl hydroperoxide and azo and diazo compounds, such as azobisisobutyronitrile.

The preferred catalyst system is a redox system which allows excellent control of the polymerization and enables the reaction to proceed smoothly at optimum reaction temperatures.

In the so-called redox system, the catalyst will be an oxidizing catalyst such as water soluble or partially water soluble hydroperoxide or persulfate. The catalyst then decomposes under the influence of a reducing agent such as ferrous iron or sodium hydrosulfite. The reaction is thus controlled by keeping the temperature below the temperature where the peroxide or persulfate decomposes thermally and the desired decomposition effected by the addition of controlled amounts of reducing agent.

In a preferred form, a process is carried out by mixing the monomers together in the desired proportions, mixing water and one or more anionic emulsifiers or the anionic emulsifiers together with part or all of the nonionic emulsifiers to provide an emulsion consisting of the monomer mixture, emulsifying agent and the peroxide catalyst. A portion of the mixture is then treated with sufficient reducing agent or activator to begin the reaction and allow the desired reaction temperature to be achieved. The further regulation is then effected by controlled external cooling and by the addition of further emulsion and a proportionate addition of reducing agent to continue the reaction at the desired temperature and preferably from about 15° C. to 100° C. and more preferably from about 50° C. to 80° C. After the polymerization has progressed to about 70% conversion and preferably to at least 80% conversion, but less than 95% conversion, the emulsion is cooled to about room temperature (20–30° C.). To the cooled emulsion from 0.05 to 10 parts per hundred parts of monomers of an alpha-beta vinylidene carboxylic acid are then added and the polymerization is allowed to proceed to substantial completion or to at least 97.5% conversion. The emulsion is then made alkaline with ammonium hydroxide to a final pH of about 9. Additional stabilizers and/or protective colloids or other additives may be added to protect the stable emulsion latex.

Residual monomer may be removed by steam stripping or by any known procedure for removing unreacted monomer. The latex is now ready for use in textile treating or for pigmentation to make pigmented paints or the like.

Acrylate latices, as normally prepared, are required to have a certain degree of stability. This stability is usually determined as ionic or electrolyte stability, mechanical stability and freeze-thaw stability.

Latices must be sufficiently stable so that they are able to withstand the mechanical shearing stresses set up during routine handling. If they are not sufficiently stable, losses may be encountered through partial or, in the extreme case, complete gelation or coagulation. In some cases it may be desirable to actually grind pigment into a latex, and this would require good mechanical stability. The mechanical stability is usually determined by vigorous agitation in a mixer such as a Hamilton-Beach mixer for a period of, say, 30 minutes. If by visual examination the latex shows coagulation, the latex fails. If, on the other hand, no coagulum is observed, the latex is said to possess mechanical stability.

In the course of formulating paint from latex polymers, a wide variety of materials are used including pigments, dispersants, wetting agents, fungicides, water and the like. Any one or all of these may introduce salts into the latex system. Therefore, it is desirable that the latex exhibits some degree of stability to salts. In order to measure the resistance of the latex to electrolytes, various types of reagents are used, as for example, 5% aqueous sodium chloride, 50% aqueous isopropyl alcohol, 5% aqueous calcium chloride and 5% aqueous alum (potassium aluminum sulfate). The test is conducted by mixing, as for example, by shaking, equal volumes of latex and reagent. If no coagulation results after 24 hours, the latex passes the ion stability test.

During normal shipment and use, latex is generally protected from freezing. However, this may not always be possible; hence, it is desirable that any latex possess some resistance to freezing and thawing. As a test for acceptability, five cycles of alternate freezing and thawing for 24 hour periods are generally used. If the latex is not affected by such cycling, that is, does not coagulate or gel, it is deemed to possess freeze-thaw stability.

In order to better illustrate the invention, the following examples are given. The reactants, their proportions, and other specific ingredients of the recipes are presented as being typical and various modifications can be made in view of the foregoing disclosure and discussion without departing from the spirit or scope of the disclosure or of the claims. Unless otherwise specified, parts and percentages disclosed in the examples are by weight.

*Example I*

The apparatus consisted of a conventional three-liter reaction flask, with one central and four peripheral ground glass openings, fitted with a reflux condenser, stirrer, thermometer, nitrogen gas inlet tube, a two-liter separatory funnel with 100 ml. graduations and 250 ml. graduated dropping funnel. A monomer mixture was prepared by mixing the following ingredients in the proportions given:

121.7 g. (15.0%) of isoprene
284.03 g. (35.0%) of styrene
389.52 g. (48.0%) of ethyl acrylate
16.23 g. (2.0%) of methacrylic acid 811.5 g.

This monomer mixture was then incorporated into an emulsion premix by adding the following material to the two-liter separatory funnel and subjecting the mixture to three cycles of shaking and standing:

811.5 g. monomers
330 ml. distilled water
7.24 g. Emcol P10–59 (ammonium salt of alkyl aryl sulfonic acid)
8.12 g. OPE–30 (octylphenol-ethylene oxide (1:30) condensation product, a solution of 25% solids)
8.12 g. Triton X–100 (octyl-phenol-ethylene oxide (1:10) condensation product, a solution of 25% solids)
1.8 ml. 25% solution $(NH_4)_2S_2O_8$
1.51 g. tertiarybutyl hydroperoxide (71% active ingredients)

The reaction flask was swept with nitrogen and 435 ml. of distilled water and 480 ml. of emulsion premix were added. At this time 24.34 g. of OPE–30 (25% solids) and 24.34 g. of Triton X–100 (25% solids) were also added to the flask.

The kettle was cooled to 15° C. and 6.7 ml. of 9.1% solution of $Na_2S_2O_4$ and 1.8 ml. of 1% $FeSO_4 \cdot 7H_2O$ were added under nitrogen. The temperature was then raised to 70° C. and incremental addition of the emulsion premix was started and continued at a rate to maintain smooth reaction.

The balance of the feed emulsion (ca. 820 ml.) was added over a period of 2 hours while maintaining an average temperature of about 72° C. Reducing agent was added incrementally and proportionally to the amount of tetiarybutyl hydroperoxide being added via feed emulsion to maintain a steady supply of free radicals. The balance of the reducing agent was added in combination with nonionic surfactant in 145 ml. of a solution consisting of 11.6 ml. (12.4 g.) of 9.1% sodium hydrosulfite solution, 24.34 g. (0.75 phm.) of a solution of octylphenol-ethylene oxide (1:30) condensation product (25% solids) and 24.34 g. (0.75 phm.) of a solution of Triton X–100 (25% solids). This solution was introduced dropwise in such a manner that when all the emulsion premix had been added, there remained 40 ml. of the original 145 ml. of $Na_2S_2O_4$-nonionic solution in the separatory funnel. To ensure complete reaction, 0.50 g. of tertiarybutyl hydroperoxide (TBHP) and 0.3 ml. of 25% solution of ammonium persulfate were added with concomitant addition of the balance of the $Na_2S_2O_4$-octylphenol-ethylene oxide solution. The total dosage of TBHP was 1.43 g. of 0.18 phm. of active ingredient. Digestion was continued one-half hour at ca. 72° C.

The total reaction mixture (1868 g.) was cooled to 25° C. and filtered through two layers of cheesecloth. The precoagulum, after washing and drying, amounted to 45.0 g. or 5.5 phm. (parts per hundred parts monomer). The total solids content was determined to be 37.0% compared to a calculated value of 44.65%, representing 83.1% conversion from monomer to polymer. The average particle size in the latex was determined by the light transmission method to be about 1000 A.

To 100 g. of the fresh, cooled, filtered latex having an 83.1% conversion, there was added 4.20 g. of a 10% solution of glacial methacrylic acid containing 0.025% methyl hydroquinone inhibitor. This represents 1 part of methacrylic acid per 100 parts of monomer. Another 100 g. sample of the latex was taken but no additional methacrylic acid was used. Both samples were then stored for five days with the conversion being determined by total solids from time to time. At the end of the five days, the latex samples were adjusted to a pH of 9.0 with ammonia and further evaluated. The results are tabulated in the following table:

| Age, days | Fresh latex alone, percent conversion | Fresh latex plus 1 phm. methacrylic acid, percent conversion |
|---|---|---|
| 0 | 83.1 | |
| 5 | 97.6 | 97.5 |

The freeze-thaw stability of the treated and untreated latex was determined by subjecting 8 oz. samples to 5 cycles of freezing and thawing, which cycles consisted of 24 hours at −20° C. and 24 hours at +25° C. At the end of each cycle, the latex was visually examined to determine if coagulation had occurred. The treated latex passed 5 cycles without significant coagulation, whereas the unreacted latex coagulated after only 1 cycle.

In order to evaluate the ion (electrolyte) stability of the latices, equal volumes (10 cc.) of latex and a reagent (5% aqueous sodium chloride or 5% aqueous calcium or 5% aqueous alum) were shaken together for several minutes and were visually inspected for coagulum after 24 hours. The treated latex exhibited no coagulum when mixed with the three above-noted electrolyte solutions while the untreated latex coagulated with all reagents.

The mechanical stability of the two latices was determined by placing a sample of the latex (200 ml.) in a four-quart, 7⅝-inch ring diameter tin funnel which had the bottom sealed. The funnel containing the latex was then placed under a Number Thirty Hamilton-Beach Drink Master 4-Fold Aerator. The standard impeller of the aerator was replaced with a flat washer 2.97 cm. in diameter. The aerator was permitted to run at high speed until the latex coagulates or for 30 minutes, whichever is shorter. If the latex coagulates before 30 minutes of this mechanical agitation, it is deemed to have failed the mechanical stability test. The treated latex passed by not coagulating after 30 minutes, whereas the untreated latex failed. The properties are summarized below:

| Properties | Fresh latex alone | Fresh latex plus 1 phm. methacrylic acid |
|---|---|---|
| Mechanical stability | Failed | Passed. |
| Freeze-thaw, cycles passed | 0 | 5. |
| Electrolyte stability | Failed | Passed. |

Thus, the latex treated with 1 phm. methacrylic acid possessed satisfactory freeze-thaw stability, electrolyte stability and mechanical stability while the untreated latex failed these essential properties.

Example II

The procedure of Example I is repeated except that hexyl methacrylate is substituted for the ethyl acrylate. A paint latex is obtained which is stable when subjected to freezing and thawing, agitation and the addition of electrolytes.

Example III

The procedure of Example I is repeated except that butadiene under pressure is substituted for the isoprene. A freeze-thaw stable and mechanical stable latex is obtained.

Example IV

The apparatus consisted of a conventional three-liter reaction flask, with one central and four peripheral ground glass openings, fitted with a reflux condenser, stirrer, thermometer, nitrogen gas inlet tube, a two-liter separatory funnel with 100 ml. graduations, and a 250 ml. graduated dropping funnel.

A monomer mixture was prepared by mixing the following ingredients in the proportions given:

81.15 g. (10%) of isoprene
324.60 g. (40%) of styrene
389.52 g. (48.0%) of ethyl acrylate
16.23 g. (2.0%) of methacrylic acid 811.5 g.

This monomer mixture was then incorporated into an emulsion premix by adding the following material to the two-liter separatory funnel and subjecting the mixture to three cycles of shaking and standing:

811.5 g. monomers
330 ml. distilled water
16.77 g. (0.62 phm.) of Triton 770 (sodium salt of alkyl aryl polyethoxy-ethanol sulfate, solution of 30% solids)
2.13 g. (0.21 phm.) of Aerosol MA (sodium dihexylsulfosuccinate, 80% solids)
8.12 g. (0.25 phm.) of OPE-30 (octyl-phenyl-ethylene oxide (1:30) condensation product, a solution of 25% solids)
8.12 g. (0.25 phm.) of Triton X-100 (octyl-phenol-ethylene oxide (1:10) condensation product, a solution of 25% solids)
1.80 ml. (2.00 g.) 25% solution of $(NH_4)_2S_2O_8$
1.51 g. tertiary butyl hydroperoxide (71% active ingredient)

The reaction flask was swept with nitrogen and 435 ml. of distilled water and 480 ml. of emulsion premix were added. At this time 24.34 g. of OPE-30 (25% solids) and 24.34 g. of Triton X-100 (25% solids) were also added.

The kettle was cooled to about 15° C. and 6.7 ml. (7.2 g.) of 9.1% solution of $Na_2S_2O_4$ and 1.8 ml. of 1% $FeSO_4 \cdot 7H_2O$ were added under nitrogen. The temperature was then raised to 70° C. and incremental addition of the emulsion premix was started and continued at a rate to maintain smooth reaction.

The balance of the feed emulsion (ca. 800 ml.) was added over a period of 2 hours while maintaining an average temperature of about 72° C. Reducing agent was added incrementally and proportionally to the amount of tertiarybutyl hydroperoxide being added via the feed emulsion to maintain a steady supply of free radicals. The balance of the reducing agent was added in combination with nonionic surfactant in a solution consisting of 11.0 ml. (11.8 g.) of 9.1% sodium hydrosulfite solution, 16.22 g. (0.50 phm.) of a solution of octylphenol-ethylene oxide (1:30) condensation product (25% solids) and 16.22 g. (0.50 phm.) of a solution of Triton X-100 (25% solids). This solution was introduced dropwise as was done in Example I. Twenty drops (0.33 g.) of 71% TBHP and 0.3 ml. of 25% $(NH_4)_2S_2O_8$ were added to facilitate the reaction. Digestion was continued 1 hour at ca. 72° C.

The total reaction mixture (1810 g.) was cooled to 25° C. and filtered through two layers of cheesecloth. The total solids content was determined to be 40.1% compared to a calculated value of 43.5%, representing 92% conversion from monomer to polymer. The average particle size in the latex was determined by the light transmission method to be about 1020 A.

To 100 g. of this fresh, cooled, filtered latex was added 4.20 g. of a 10% solution of glacial methacrylic acid containing 0.025 methyl hydroquinone inhibitor. Another 100 g. sample of latex was taken and left untreated (no methacrylic acid added). After 5 days both latex samples were adjusted to a pH of 9.0 with ammonia and evaluated as to mechanical stability, freeze-thaw stability and electrolyte stability (5% aqueous solutions of NaCl, $CaCl_2$ and alum). In all instances, the untreated latex coagulated under vigorous agitation in a Hamilton-Beach mixer, coagulated after only one freeze-thaw cycle and was unstable in the presence of the electrolyte solutions. The latex which had the methacrylic acid added passed all these tests.

Example V

Example IV is substantially repeated except that an equivalent amount of itaconic acid is used in lieu of the methacrylic acid. Related results are obtained.

We claim as our invention:

1. A process for preparing freeze-thaw mechanical stable latex which comprises adding a minor portion of a monomer mixture consisting essentially of from 10% to 20% of a conjugated diene, from 2% to 55% of a compound selected from the group consisting of styrene and ring-substituted styrene, from 20% to 87.5% of a compound selected from the group consisting of alkyl acrylates having from 4 to 12 carbon atoms, alkyl methacrylates having from 8 to 16 carbon atoms and mixtures thereof, and from 0.5% to 5% by weight of the monomer mixture of an alpha-beta vinylidene carboxylic acid to an aqueous emulsion comprising an emulsifier and a free-radical initiator, and then adding incrementally during the polymerization the major portion of said monomer mixture while maintaining the temperature of the reaction mixture between about 15° C. and 100° C. until at least 70% conversion but less than 95% conversion is achieved, then adjusting the emulsion temperature to from 20° C. to 60° C. and adding from 0.05 to 10 parts per 100 parts of monomer of an alpha-beta vinylidene carboxylic acid, then allowing the polymerization to proceed to substantial completion.

2. The process as in claim 1 wherein the temperature of the reaction mixture is maintained between about 70° C. and 75° C. during at least 75% of the reaction period.

3. The process as in claim 1 wherein a minor portion of the reaction mixture is first brought together and the reaction temperature is adjusted between about 70° C.

and 75° C. and thereafter the major portion of the reaction mixture is added in multiple additions while maintaining the reaction temperature between 70° C. and 75° C.

4. A process as in claim 1 wherein the emulsifier consists of a salt of alkyl aryl sulfonic acid and at least one octylphenolethylene oxide condensation product.

5. A process as in claim 1 wherein the emulsifier consists of at least one anionic emulsifier and at least one nonionic emulsifier.

6. A process as in claim 7 wherein the emulsion is adjusted to a pH of 9.0 after adding from 0.05 to 10.0 parts per 100 parts of monomers of an alpha-beta vinylidene carboxylic acid.

7. A process for preparing freeze-thaw mechanical stable latex which comprises adding a reducing agent in an amount sufficient to cause polymerization to a minor portion of an aqueous emulsion containing (1) a monomer mixture consisting essentially of from 10% to 20% of a conjugated diene, from 2% to 55% of a compound selected from the group consisting of styrene and ring-substituted styrene, from 20% to 87.5% of a compound selected from the group consisting of an alkyl acrylate having from 4 to 12 carbon atoms, alkyl methacrylates having from 8 to 16 carbon atoms and mixtures thereof, and from 0.5% to 5% by weight of the monomer mixture of an alpha-beta vinylidene carboxylic acid, (2) an emulsifier, and (3) an oxidizing agent, then adding during said polymerization the major portion of the emulsion in multiple additions while simultaneously keeping the temperature of the reaction mixture between about 15° C. and 85° C. until at least 70% conversion but less than 95% conversion is achieved, then adjusting the emulsion temperature to from 20° C. to 60° C. and adding from 0.05 to 10.0 parts per 100 parts of monomers of an alpha-beta vinylidene carboxylic acid, then allowing the polymerization to proceed to substantial completion.

8. A process for preparing freeze-thaw mechanical stable latex which comprises adding a reducing agent in an amount sufficient to cause polymerization to a minor portion of an aqueous emulsion containing (1) a monomer mixture consisting of 15% butadiene, 35% styrene, 48% ethyl acrylate and 2% by weight of methacrylic acid, (2) an emulsifier, and (3) an oxidizing agent, then adding during said polymerization the major portion of the emulsion in multiple additions while simultaneously keeping the temperature of the reaction mixture between about 70° C. and 75° C. until at least 80% conversion but less than 95% conversion is achieved, then adjusting the emulsion temperature to from 20° C. to 30° C. and adding 1 part per 100 parts of monomers of methacrylic acid then allowing the polymerization to proceed to at least 97.5%.

9. A freeze-thaw stable and mechanical stable latex prepared by the process which comprises adding a reducing agent in an amount sufficient to cause polymerization to a minor portion of an aqueous emulsion containing (1) a monomer mixture consisting essentially of from 10% to 20% of a conjugated diene, from 2% to 55% of a compound selected from the group consisting of styrene and ring-substituted styrene, from 20% to 87.5% of a compound selected from the group consisting of an alkyl acrylate having from 4 to 12 carbon atoms, alkyl methacrylates having from 8 to 16 carbon atoms and mixtures thereof, and from 0.5% to 5% by weight of the monomer mixture of an alpha-beta vinylidene carboxylic acid, (2) an emulsifier, and (3) an oxidizing agent, then adding during said polymerization the major portion of the emulsion in multiple additions while simultaneously keeping the temperature of the reaction mixture between about 15° C. and 85° C. until at least 70% conversion but less than 95% conversion is achieved, then adjusting the emulsion temperature to from 20° C. to 60° C. and adding from 0.05 to 10.0 parts per 100 parts of monomers of an alpha-beta vinylidene carboxylic acid, then allowing the polymerization to proceed to substantial completion.

References Cited by the Examiner

UNITED STATES PATENTS

| | | | |
|---|---|---|---|
| 2,767,153 | 10/56 | Sutton | 260—29.6 |
| 2,837,444 | 6/58 | Hahn | 260—29.6 |
| 2,847,404 | 8/58 | Hoertz | 260—29.7 |
| 2,868,754 | 1/59 | Eilbeck et al. | 260—29.7 |
| 2,889,236 | 6/59 | Hahn | 260—29.6 |
| 2,962,465 | 11/60 | Lindstrom et al. | 260—29.6 |

MURRAY TILLMAN, *Primary Examiner.*

LEON BERCOVITZ, WILLIAM SHORT, *Examiners.*